United States Patent
Farrugia et al.

(10) Patent No.: US 12,401,846 B2
(45) Date of Patent: Aug. 26, 2025

(54) TECHNIQUES FOR DYNAMICALLY GENERATING MEDIA CONTENT CLIPS BASED ON KEY EVENTS THAT OCCUR

(71) Applicant: Apple Inc., Cupertino, CA (US)

(72) Inventors: Augustin J. Farrugia, Los Altos Hills, CA (US); David Varas Gonzalez, Barcelona (ES); Derek A. Hunter, Aptos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/458,287

(22) Filed: Aug. 30, 2023

(65) Prior Publication Data

US 2024/0107114 A1   Mar. 28, 2024

Related U.S. Application Data

(60) Provisional application No. 63/377,027, filed on Sep. 24, 2022.

(51) Int. Cl.
*H04N 5/445* (2011.01)
*H04N 21/44* (2011.01)
*H04N 21/845* (2011.01)

(52) U.S. Cl.
CPC ... *H04N 21/44008* (2013.01); *H04N 21/8456* (2013.01)

(58) Field of Classification Search
CPC .............. H04N 21/44008; H04N 21/8456
See application file for complete search history.

(56) References Cited

U.S. PATENT DOCUMENTS

| | | | |
|---|---|---|---|
| 2013/0282747 A1* | 10/2013 | Cheng | G06F 16/732 707/758 |
| 2014/0270482 A1* | 9/2014 | Chakraborty | G06V 20/10 382/154 |
| 2014/0328570 A1* | 11/2014 | Cheng | G06F 16/43 386/241 |
| 2015/0221316 A1* | 8/2015 | Mufti | G10L 19/018 700/94 |
| 2016/0353172 A1* | 12/2016 | Miller | G06F 3/0482 |
| 2017/0025152 A1 | 1/2017 | Jaime et al. | |
| 2018/0027282 A1* | 1/2018 | Hirschfeld | H04N 21/4334 715/716 |
| 2019/0356948 A1* | 11/2019 | Stojancic | G06V 20/48 |
| 2019/0373322 A1* | 12/2019 | Rojas-Echenique | G06N 3/045 |

(Continued)

FOREIGN PATENT DOCUMENTS

EP   3404921 A1   11/2018

OTHER PUBLICATIONS

PCT Patent Application No. PCT/US2023/031541—International Search Report and Written Opinion dated Nov. 9, 2023.

*Primary Examiner* — Annan Q Shang
(74) *Attorney, Agent, or Firm* — DICKINSON WRIGHT RLLP

(57) ABSTRACT

This Application sets forth techniques for dynamically generating media content clips based on key events that occur. In particular, the techniques enable key events to be identified among a stream of events that take place in the real world (e.g., at awards events, at social events, at sporting events, etc.) and enable media content clips to be dynamically generated for the key events. In turn, the key events and their respective media content clips can be presented to users for viewing.

20 Claims, 6 Drawing Sheets

(56) References Cited

U.S. PATENT DOCUMENTS

| | | | |
|---|---|---|---|
| 2021/0349883 A1* | 11/2021 | Majumdar | H04N 21/6582 |
| 2022/0141549 A1* | 5/2022 | Majumdar | H04N 21/8456 |
| | | | 709/231 |
| 2022/0283849 A1* | 9/2022 | Miller | G06F 9/4862 |

* cited by examiner

Step 302: A computing device receives a key event object and displays information derived from the key event object Step 304: The computing device begins playback of a media content clip associated with the key event object in response to receiving a selection

TECHNIQUES FOR DYNAMICALLY GENERATING MEDIA CONTENT CLIPS BASED ON KEY EVENTS THAT OCCUR

CROSS-REFERENCE TO RELATED APPLICATIONS

The present application claims the benefit of U.S. Provisional Application No. 63/377,027, entitled "TECHNIQUES FOR DYNAMICALLY GENERATING MEDIA CONTENT CLIPS BASED ON KEY EVENTS THAT OCCUR," filed Sep. 24, 2022, the content of which is incorporated by reference herein in its entirety for all purposes.

FIELD

The described embodiments set forth techniques for dynamically generating media content clips based on key events that occur. In particular, the techniques enable key events to be identified among a stream of events that take place and enable media content clips to be dynamically generated for the key events. In turn, the key events and their respective media content clips can be presented to users for viewing.

BACKGROUND

The number of real-world events that may be of interest to individuals continues to only grow as time goes on. This is a result of, for example, the ever-increasing number of activities that are taking place in the world, such as awards events, social events, sporting events, and so on. In this regard, it can be overwhelming for individuals to effectively identify key events that may be of interest to them. Moreover, even when a key event is located or noticed by an individual, they typically are faced with the task of manual entering queries into different software applications/services to obtain additional details about the key event.

In one example scenario, a given individual may receive a text message from a friend, family member, colleague, etc., about a key event that just occurred, e.g., a home run in an important baseball game. In turn, the individual typically resorts to accessing a search engine to identify supplemental information associated with the event (such as recordings of the event (that often are not yet available)), or to tuning into a live view of the game (where a rewind feature to view the key event is typically not possible). Moreover, even when access to the supplemental information is achieved through the foregoing efforts, the individual is still faced with the cumbersome task of parsing through extraneous information (e.g., events that precede/succeed the event of interest) in order to reach the information that is of actual interest to them.

Accordingly, there exists a need for improved techniques for enabling users to receive notifications of key events that are relevant to them and to conveniently access supplemental information associated with the key events.

SUMMARY

This Application sets forth techniques for dynamically generating media content clips based on key events that occur. In particular, the techniques enable key events to be identified among a stream of events that take place and enable media content clips to be dynamically generated for the key events. In turn, the key events and their respective media content clips can be presented to users for viewing.

One embodiment sets forth a method for dynamically generating media content clips based on key events that occur. According to some embodiments, the method can be implemented by a computing device associated with an event activity analyzer, and include the steps of (1) receiving, from an event activity provider, a plurality of event objects, (2) analyzing the plurality of event objects against a set of rules to identify a plurality of key event objects among the plurality of event objects, (3) for each key event object of the plurality of key event objects: (i) issuing, to a media content analyzer, a respective first request to generate a respective media content clip for the key event object, (ii) receiving, from the media content analyzer, a unique identifier (ID) for the respective media content clip, and (iii) assigning the unique ID to the key event object to associate the key event object with the respective media content clip, (4) receiving, from a client computing device, a second request to access a media content clip associated with a particular key event object of the plurality of key event objects, and (5) providing the unique ID assigned to the particular key event object to cause the client computing device to playback the media content clip.

Other embodiments include a non-transitory computer readable medium configured to store instructions that, when executed by a processor included in a computing device, cause the computing device to implement the methods and techniques described in this disclosure. Yet other embodiments include hardware computing devices that include processors that can be configured to cause the hardware computing devices to implement the methods and techniques described in this disclosure.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
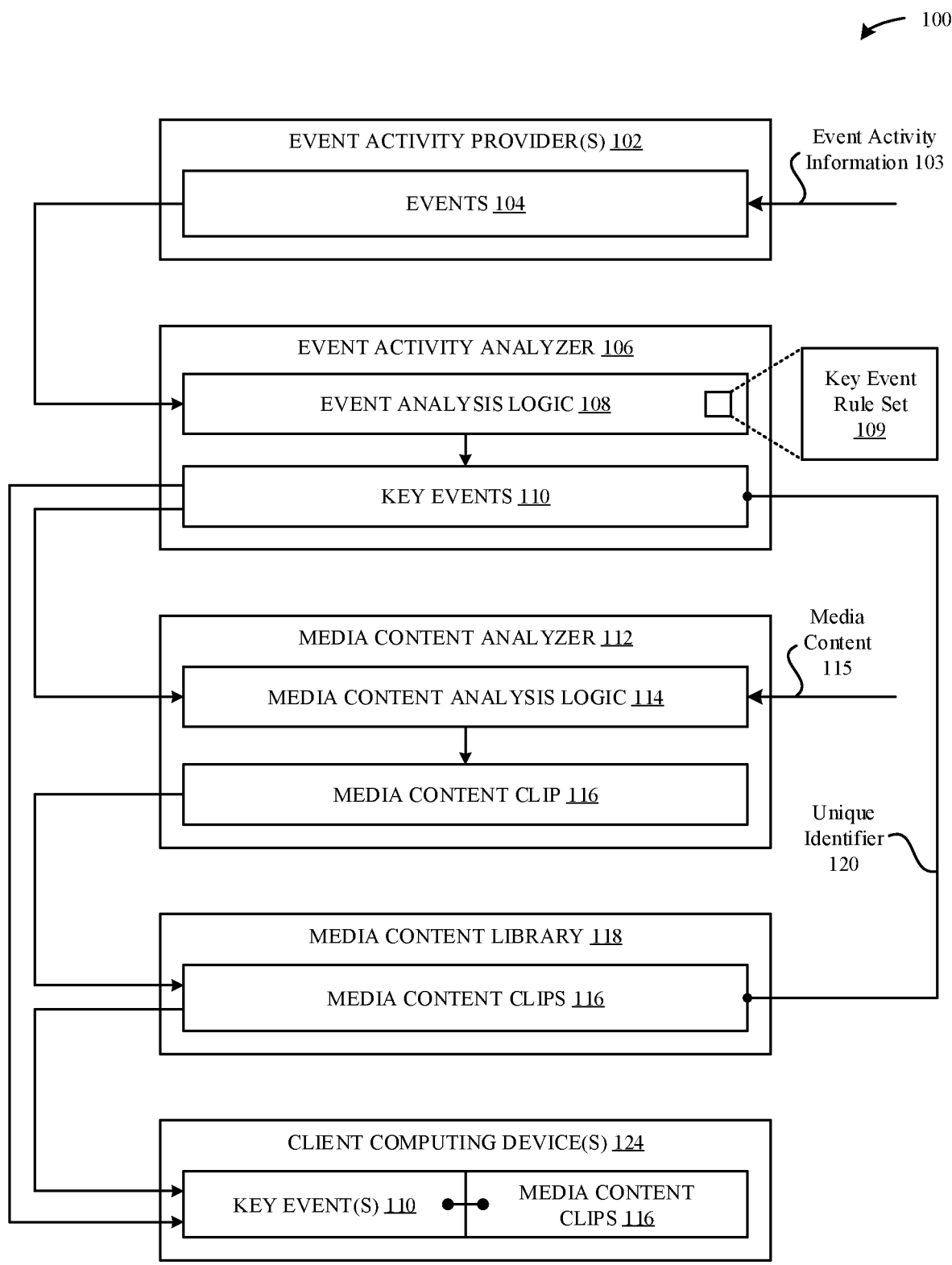
FIG. 1 illustrates a block diagram of different components of a system for implementing the various techniques described herein, according to some embodiments.

FIG. 1 illustrates a block diagram of different components of a system 100 for implementing the various techniques described herein, according to some embodiments. As shown in FIG. 1, the system 100 includes one or more event activity providers 102, one or more event activity analyzers 106, one or more media content analyzers 112, one or more media content libraries 118, and one or more client computing devices 124.

According to some embodiments, a given event activity provider 102 can be configured to obtain information pertaining to real-world events that take place, which is illustrated in FIG. 1 as event activity information 103. In turn, the event activity provider 102 can be configured to generate events 104 based on the event activity information 103. Under one approach, the event activity provider 102 can implement an application programming interface (API) that enables information associated with the real-world events to be provided to the event activity provider 102. The real-world information can be obtained/provided using any conceivable approach without departing from the scope of this disclosure. For example, one or more computing devices can be located at a sports stadium and be configured to gather information under automated, semi-automated, or manual approaches. For example, under the automated approach, one or more sensors, cameras, etc., can be utilized to automatically parse and report out events as they take place (e.g., using machine learning). In another example, under the semi-automated approach, the aforementioned equipment can be utilized to present information to individuals (e.g., operators) that is then analyzed/tailored by individuals. In another example, under the manual approach, one or more individuals may be assigned to gather information and input it using the aforementioned equipment. Additionally, it is noted that the API/event activity provider 102 can be configured to identify events by analyzing raw/unprocessed information that is received through the API. For example, the API can receive an audio and/or video stream of any event (e.g., a sporting event, a concert event, an online gaming event, etc.) and utilize various techniques (e.g., machine learning) to effectively parse events that take place. It is noted that the foregoing examples are not meant to be limiting and that any approach can be utilized by the event activity provider 102 to effectively obtain and organize useful information about real-world events. In turn, the event activity provider 102 can provide the information to various entities, such as the event activity analyzer 106 described below in greater detail.

According to some embodiments, the event activity analyzer 106 can be configured to receive events 104 from the event activity providers 102. As shown in FIG. 1, the event activity analyzer 106 can be configured to implement event analysis logic 108 to enable key events 110 to be identified among the received events 104. More specifically, the event analysis logic 108 can be configured to enforce a key event rule set 109 that defines various criteria through which the key events 110 can be identified. In one example, for example, the key event rule set 109 can specify that, for baseball games, the key events include runs, homeruns, and grand slams (such that other common events such as strikeouts, walks, inning shifts, etc., do not qualify as key events 110). In another example, the key event rule set 109 can specify that, for ice hockey games, the key events include goals and fights. It is noted that the foregoing examples are not meant to be limiting, and that event analysis logic 108/key event rule set 109 can be configured to identify key events using any criteria, and any level of granularity, without departing from the scope of this disclosure. In any case, when a key event 110 is identified, the event activity analyzer 106 can store any information about circumstances related to the key event 110 (e.g., the time at which the key event 110 occurred, contextual information about the key event 110, effects of the key event 110, and so on).

According to some embodiments, when a key event 110 is identified, the event activity analyzer 106 can be configured provide information about the key event 110 to the media content analyzer 112. According to some embodiments, the media content analyzer 112 can be configured to receive, from various sources, media content 115 pertaining to various real-world events (e.g., concert events, gaming events, sporting events, award events, etc.). The media content 115 can represent, for example, audio and/or video streams that are live (with or without delay) or recorded. As shown in FIG. 1, the media content analyzer 112 can be configured to implement media content analysis logic 114 for analyzing the media content 115 to generate media content clips 116. According to some embodiments, the media content analysis logic 114 can implement any approach that can be used to effectively identify information to be extracted from the media content 115 based on the key events 110 received by the media content analyzer 112 from the event activity analyzer 106.

In one example, the media content analyzer 112 receives a key event 110 that indicates a goal occurred at 5:55:22 PM in a particular soccer game. In turn, the media content analyzer 112 can determine whether the media content 115 includes information pertaining to the particular soccer game, such as a live stream/ongoing recording thereof. In turn—and, assuming the media content 115 does include the information—the media content analysis logic 114 can extract information from the media content 115 based on the key event 110. For example, the media content analysis logic 114 can carve out a segment of the recording based on the time of 5:55:22 PM indicated in the key event 110. It is noted that the segment time (or other aspect of the segment) can be based on the key event 110 (or other information). For example, a segment of thirty (30) seconds prior to the key event and thirty (30 seconds) after a key event may be sufficient when the key event is common (e.g., a baseball run). In contrast, a segment beginning several minutes prior to (and ending several minutes after) a key event may be appropriate when the key event is rare (e.g., a baseball grand slam). It is noted that the foregoing examples are not meant to be limiting, and that the media content analysis logic 114 can be configured to generate media content clips 116 based on key events 110/media content 115 using any conceivable approach and at any level of granularity without departing from the scope of this disclosure.

As shown in FIG. 1, media content clips 116 generated by the media content analyzer 112 can be provided by the media content analyzer 112 to one or more media content libraries 118. According to some embodiments, a media content library 118 that receives a media content clip 116 can be configured to store the media content clip 116 using any conceivable approach. For example, the media content library 118 can store the media content clip 116 into a database to which the media content library 118 is communicably coupled. In doing so, the media content library 118 can generate a unique identifier 120 for the media content clip 116 and provide the unique identifier 120 to the event activity analyzer 106. In turn, the event activity analyzer 106 can associate the unique identifier 120 with the key event 110 that correlates to the media content clip 116. In this manner, when the event activity analyzer 106 provides the key event 110 to one or more client computing devices 124, they can utilize the unique identifier 120 to access the corresponding media content clip 116 (e.g., by interfacing with the media content library 118 to stream or download the media content clip 116). It is noted that the key events 110 described herein are not limited to single/respective media content clips 116. On the contrary, a given key event 110 can refer to any number of media content clips 116 that the media content analyzer 112 determines are relevant to the key event 110. When this occurs, the media content analyzer 112 can generate respective unique identifiers 120 for the media content clips 116 and distribute the unique identifiers 120 (e.g., to the event activity analyzer 106 and the media content library 118) using similar techniques to those described herein.

Figure 3A:
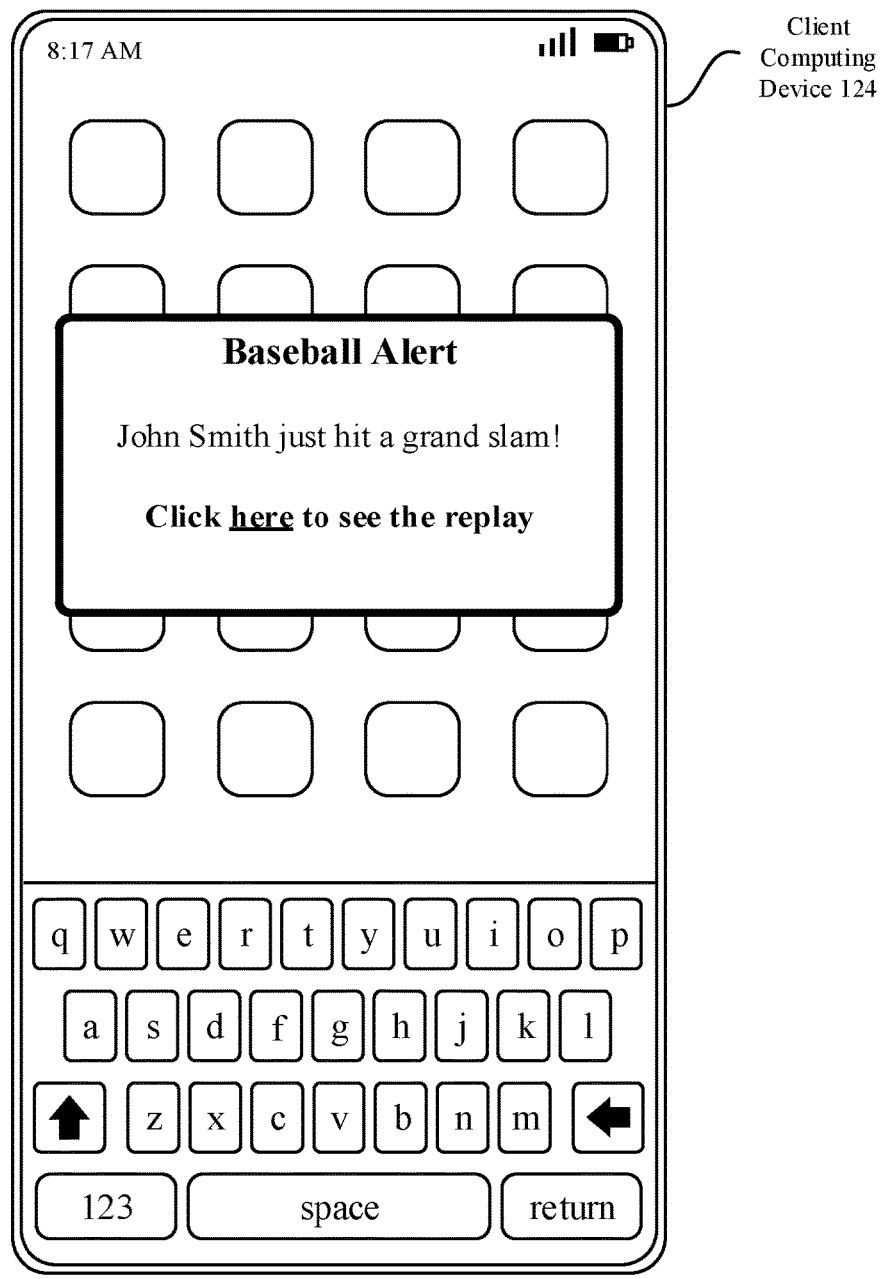
FIGS. 3A-3B illustrate conceptual diagrams of an example process through which a client computing device obtains a key event and accesses a media content clip associated with the key event, according to some embodiments.
Figure 3B:
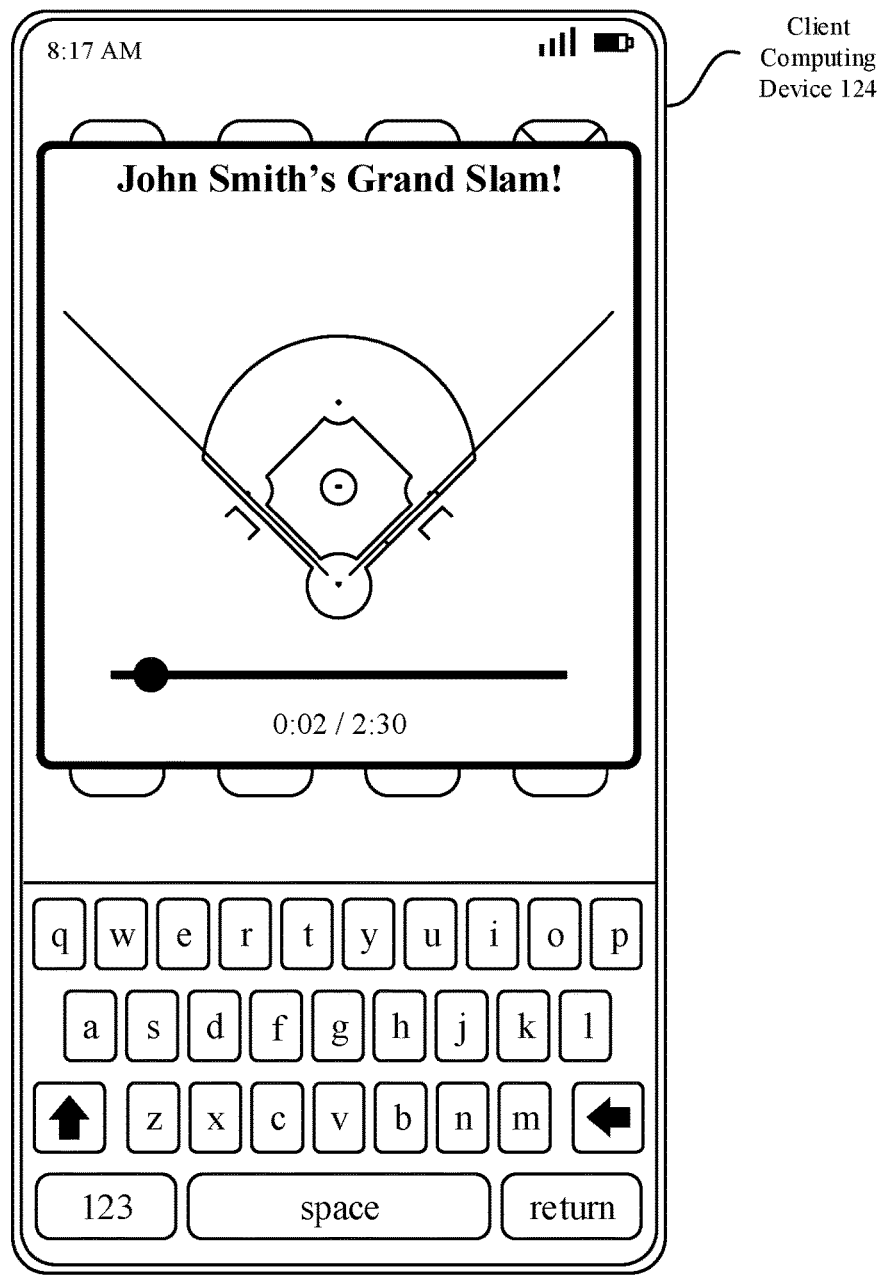

Additionally, and as shown in FIG. 1, a given client computing device 124 can be configured to receive one or more key events 110 from the event activity analyzer 106. Receipt of the key events 110 can occur, for example, in conjunction with the client computing device 124 issuing a query to the event activity analyzer 106 to obtain key events 110 that may be of interest to a user of the client computing device 124. In another example, the event activity analyzer 106 can maintain the necessary information to manage preferences of the users of the client computing devices 124 and push (respectively) relevant key events 110 to the users/client computing devices 124 as they are identified. In any case, when the client computing device 124 receives a given key event 110, the client computing device 124 can display information (e.g., on a display device that is communicably coupled to the client computing device 124) about the key event 110 (e.g., as illustrated in FIGS. 3A-3B and discussed below). Additionally, the displayed information can enable a user of the client computing device 124 to obtain (e.g., stream or download) the media content clip 116 associated with the key event 110.

Accordingly, FIG. 1 sets forth a system that can enable media content clips associated with key real-world events to be dynamically generated and provided to users/client computing devices 124. A more detailed breakdown of the interactions between the various entities illustrated in FIG. 1 (and described above) is provided below in conjunction with FIG. 2.

Figure 2:
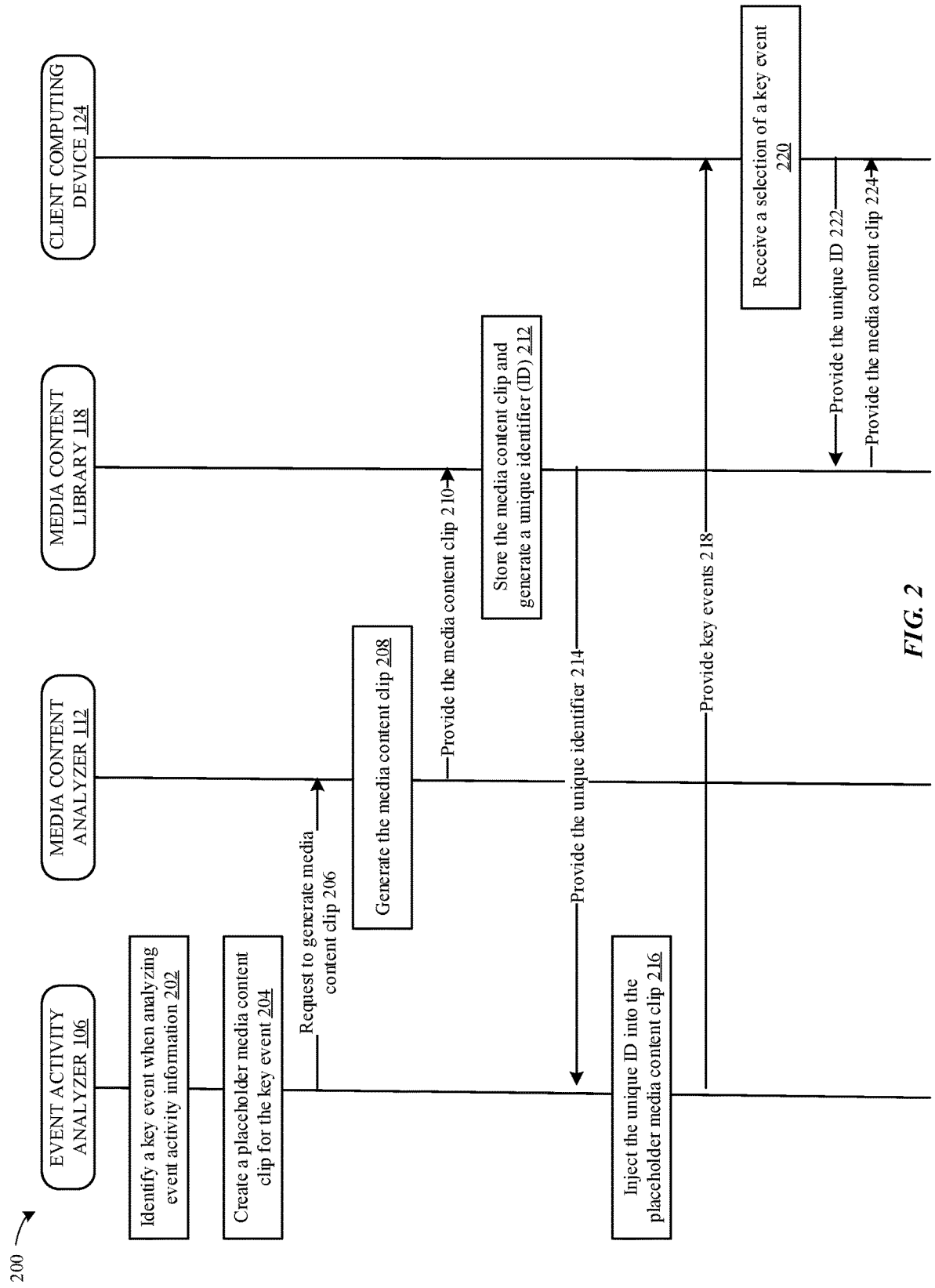
FIG. 2 illustrates a sequence diagram of interactions between an event activity analyzer, a media content analyzer, a media content library, and a client computing device (of FIG. 1) to enable the techniques discussed herein to be implemented, according to some embodiments.

FIG. 2 illustrates a sequence diagram 200 of interactions between an event activity analyzer 106, a media content analyzer 112, a media content library 118, and a client computing device 124 to enable the techniques discussed herein to be implemented, according to some embodiments. As shown in FIG. 2, a step 202 can involve the event activity analyzer 106 identifying a key event 110 when analyzing event activity information 103 (e.g., as described above in conjunction with FIG. 1). A step 204 can involve the event activity analyzer 106 creating a placeholder media content clip 116 for the key event 110. It is noted that the upfront creation of the placeholder media content clips 116 can be beneficial in that it allows for the event activity analyzer 106 to perform work (i.e., the processing overhead involved in creating a file that will reference the media content clip 116 once it is created) while the media content analyzer 112 generates the media content clip 116 (e.g., as described above in conjunction with FIG. 1).

As shown in FIG. 2, a step 206 involves the event activity analyzer 106 issuing a request to generate a media content clip 116 for the key event 110. The request can include, for example, the key event 110 (or a subset of information stored by the key event 110), as well as any other information that enables the media content analyzer 112 to accurately generate a media content clip 116 for the key event 110.

Next, a step 208 involves the media content analyzer 112 generating a media content clip 116 (e.g., as described above in conjunction with FIG. 1). In turn, a step 210 involves the media content analyzer 112 providing the media content clip 116 to the media content library 118 (e.g., as described above in conjunction with FIG. 1). At step 212, the media content library 118 stores the media content clip 116 and generates a unique identifier 120 (e.g., as described above in conjunction with FIG. 1).

In turn, at step 214, the media content library 118 provides the unique identifier 120 to the event activity analyzer 106 (e.g., as described above in conjunction with FIG. 1). Next, at step 216, the event activity analyzer 106 injects the unique identifier 120 into the placeholder media content clip 116. At this juncture, the event activity analyzer 106/media content library 118 are capable of providing the key event 110/media content clip 116—as well as other previously-generated key events 110/media content clips 116—to client computing devices 124 that may be interested in the information or that specifically request the information (e.g., as described above in conjunction with FIG. 1).

Accordingly, at step 218, the event activity analyzer 106 provides one or more key events 110 to a client computing device 124 (e.g., as described above in conjunction with FIG. 1). Again, the event activity analyzer 106 can provide the one or more key events 110 in response to a request (e.g., a search query, a page load, etc.) that is issued by the client computing device 124. In another example, the event activity analyzer 106 can determine, e.g., by analyzing preferences of a user associated with the client computing device 124, that the user may be interested in the one or more key events 110. Although not illustrated in FIG. 2, it is noted that the client computing device 124 can display one or more user interfaces that include information derived from the one or more key events 110 such that the user of the client computing device 124 can interact with the one or more key events 110.

At step 220, the client computing device 124 receives a selection of one of the one or more key events 110 that are provided by the event activity analyzer 106 in step 218. The selection can occur, for example, when a user is interacting with a particular key event 110 of the one or more key events 110 and selects an available option associated with the particular key event 110 (e.g., an option to view the media content clip 116 associated with the particular key event 110).

Next, at step 222, the client computing device 124 obtains the unique identifier 120 from the selected key event 110 and provides the unique identifier 120 to the media content library 118 (e.g., as described above in conjunction with FIG. 1). In turn, at step 224 the media content library 118 obtains the media content clip 116 based on the unique identifier 120 and provides the media content clip 116 to the client computing device 124 (e.g., as described above in conjunction with FIG. 1). Thereafter (and not illustrated in FIG. 2), the client computing device 124 can enable its user to interact with the media content clip 116 (e.g., playback the media content clip 116, share the media content clip 116 with others, and so on).

FIGS. 3A-3B illustrate conceptual diagrams 300 of an example process through which a client computing device 124 obtains a key event 110 and accesses a media content clip 116 associated with the key event 110, according to some embodiments. As shown in FIG. 3A, a step 302 involves the client computing device 124 receiving a key event 110 and displaying information derived from the key event 110. In the example scenario illustrated in FIG. 3A, the key event 110 concerns a grand slam that was recently hit by a fictional baseball player named John Smith, and the key event 110 is pushed to the client computing device 124 by the event activity analyzer 106 in response to identifying that the client computing device 124 (i.e., its user) may be interested in the key event 110 (e.g., using the techniques described above in conjunction with FIGS. 1-2). As shown in FIG. 3A, the displayed information includes an option to view a replay of the grand slam.

Turning now to FIG. 3B, a step 304 involves the client computing device 124 obtaining and beginning playback of a media content clip 116 associated with the key event 110 in response to receiving a selection from the user to replay the grand slam. As shown in FIG. 3B, the displayed information is updated to incorporate video playback features through which the user can conveniently replay a video associated with the grand slam.

Figure 4:
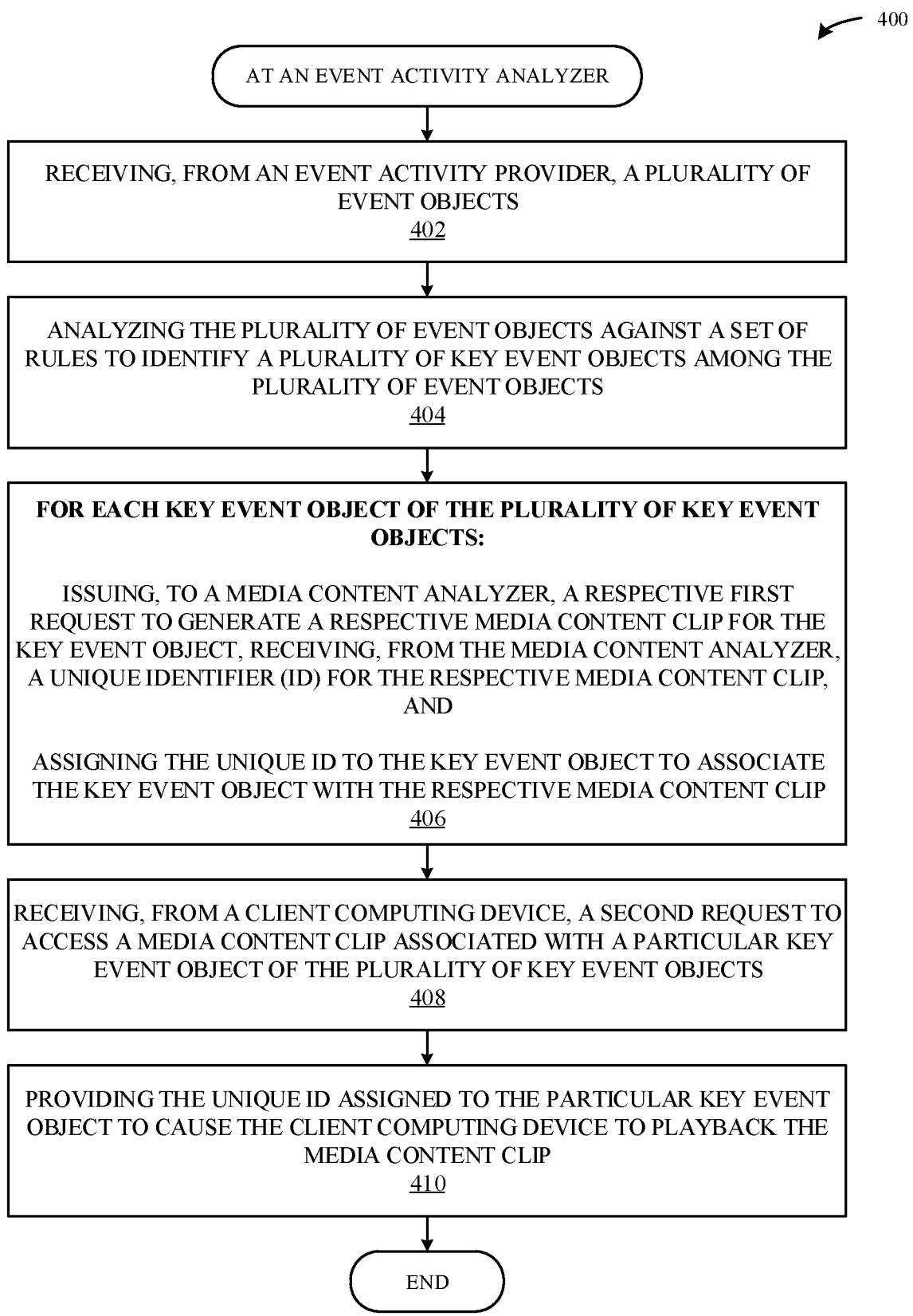
FIG. 4 illustrates a method for dynamically generating media content clips based on key events that occur, according to some embodiments.

FIG. 4 illustrates a method 400 for dynamically generating media content clips based on key events that occur, according to some embodiments. According to some embodiments, the method can be implemented by one or more computing devices associated with an event activity analyzer 106. As shown in FIG. 4, the method 400 begins at step 402, where the event activity analyzer 106 receives, from an event activity provider 102, a plurality of event objects (i.e., events 104) (e.g., as described above in conjunction with FIGS. 1-3). At step 404, the event activity analyzer 106 analyzes the plurality of events 104 against a set of rules (i.e., the key event rule set 109) to identify a plurality of key event objects (i.e., key events 110) among the plurality of events 104 (e.g., as described above in conjunction with FIGS. 1-3).

At step 406, the event activity analyzer 106 performs various steps for each key event 110 of the plurality of key events 110. In particular, the event activity analyzer 106 (1) issues, to a media content analyzer 112, a respective first request to generate a respective media content clip 116 for the key event 110, (2) receives, from the media content analyzer 112, a unique identifier 120 for the respective media content clip 116, and (3) assigns the unique identifier 120 to the key event 110 to associate the key event 110 with the respective media content clip 116 (e.g., as described above in conjunction with FIGS. 1-3).

At step 408, the event activity analyzer 106 receives, from a client computing device 124, a second request to access a media content clip 116 associated with a particular key event 110 of the plurality of key events 110 (e.g., as described above in conjunction with FIGS. 1-3). At step 410, the event activity analyzer 106 provides the unique identifier 120 assigned to the particular key event 110 to cause the client computing device 124 to playback the media content clip 116 (e.g., as described above in conjunction with FIGS. 1-3).

Figure 5:
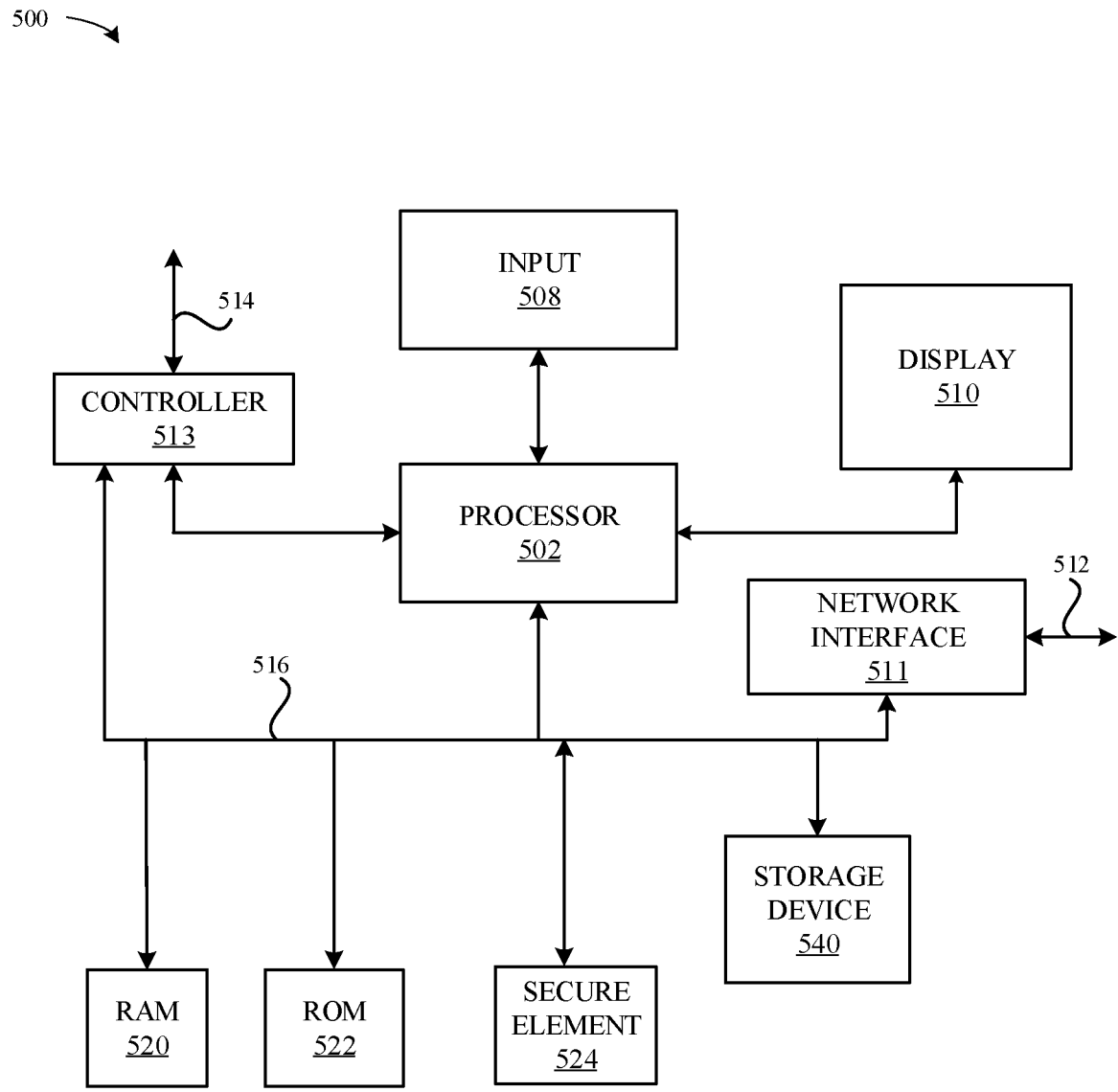
FIG. 5 illustrates a detailed view of a representative computing device that can be used to implement various techniques described herein, according to some embodiments.

FIG. 5 illustrates a detailed view of a representative computing device 500 that can be used to implement various methods described herein, according to some embodiments. In particular, the detailed view illustrates various components that can be included in computing devices associated with the event activity providers 102, computing devices associated with the event activity analyzer 106, computing devices associated with the media content analyzer 112, computing devices associated with the media content library 118, and/or the client computing devices 124. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that communicatively couples to a data link 512. In the case of a wireless connection, the network/bus interface 511 can include a wireless transceiver.

The computing device 500 also includes a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities, or processes to be executed in a non-volatile manner. The RAM 520 can provide volatile data storage, and stores instructions related to the operation of the computing device 500. The computing device 500 can further include a secure element (SE) 524 for cellular wireless system access by the computing device 500.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamically generating media content clips based on key events that occur, the method comprising, at a computing device:
   receiving, from an event activity provider, a plurality of event objects;
   analyzing the plurality of event objects against a set of rules to identify a plurality of key event objects among the plurality of event objects;
   for each key event object of the plurality of key event objects:
      issuing, to a media content analyzer, a respective first request to generate a respective media content clip for the key event object,
      receiving, from the media content analyzer, a unique identifier (ID) for the respective media content clip, and
      assigning the unique ID to the key event object to associate the key event object with the respective media content clip;
   receiving, from a client computing device, a second request to access a media content clip associated with a particular key event object of the plurality of key event objects; and
   providing the unique ID assigned to the particular key event object to cause the client computing device to playback the media content clip.

2. The method of claim 1, further comprising, in conjunction with issuing the first request:
   generating, within the key event object, a respective placeholder value for the unique ID.

3. The method of claim 2, wherein assigning the unique ID to the key event object comprises injecting the unique ID into the respective placeholder value.

4. The method of claim 1, wherein each event object of the plurality of event objects comprises information that describes at least one aspect of a respective event that occurs in the outside world.

5. The method of claim 1, wherein, prior to playing back the media content clip, the client computing device obtains the media content clip from a media content library that stores the media content clip in connection with the unique ID.

6. The method of claim 1, wherein the plurality of key event objects constitute event objects that pass through a filter that is implemented based on the set of rules.

7. The method of claim 1, wherein, for a given key event object, the respective first request includes at least a subset of information stored in the key event object that the media content analyzer utilizes as a basis for generating the respective media content clip.

8. A non-transitory computer readable storage medium configured to store instructions that, when executed by a processor included in a computing device, cause the computing device to carry out steps that include:
   receiving, from an event activity provider, a plurality of event objects;
   analyzing the plurality of event objects against a set of rules to identify a plurality of key event objects among the plurality of event objects;
   for each key event object of the plurality of key event objects:
      issuing, to a media content analyzer, a respective first request to generate a respective media content clip for the key event object,
      receiving, from the media content analyzer, a unique identifier (ID) for the respective media content clip, and
      assigning the unique ID to the key event object to associate the key event object with the respective media content clip;
   receiving, from a client computing device, a second request to access a media content clip associated with a particular key event object of the plurality of key event objects; and
   providing the unique ID assigned to the particular key event object to cause the client computing device to playback the media content clip.

9. The non-transitory computer readable storage medium of claim 8, wherein the steps further include, in conjunction with issuing the first request:
   generating, within the key event object, a respective placeholder value for the unique ID.

10. The non-transitory computer readable storage medium of claim 9, wherein assigning the unique ID to the key event object comprises injecting the unique ID into the respective placeholder value.

11. The non-transitory computer readable storage medium of claim 8, wherein each event object of the plurality of event objects comprises information that describes at least one aspect of a respective event that occurs in the outside world.

12. The non-transitory computer readable storage medium of claim 8, wherein, prior to playing back the media content clip, the client computing device obtains the media content clip from a media content library that stores the media content clip in connection with the unique ID.

13. The non-transitory computer readable storage medium of claim 8, wherein the plurality of key event objects constitute event objects that pass through a filter that is implemented based on the set of rules.

14. The non-transitory computer readable storage medium of claim 8, wherein, for a given key event object, the respective first request includes at least a subset of information stored in the key event object that the media content analyzer utilizes as a basis for generating the respective media content clip.

15. A computing device comprising a processor configured to cause the computing device to carry out steps that include:
   receiving, from an event activity provider, a plurality of event objects;
   analyzing the plurality of event objects against a set of rules to identify a plurality of key event objects among the plurality of event objects;
   for each key event object of the plurality of key event objects:
      issuing, to a media content analyzer, a respective first request to generate a respective media content clip for the key event object,
      receiving, from the media content analyzer, a unique identifier (ID) for the respective media content clip, and
      assigning the unique ID to the key event object to associate the key event object with the respective media content clip;
   receiving, from a client computing device, a second request to access a media content clip associated with a particular key event object of the plurality of key event objects; and
   providing the unique ID assigned to the particular key event object to cause the client computing device to playback the media content clip.

16. The computing device of claim 15, wherein the steps further include, in conjunction with issuing the first request:
   generating, within the key event object, a respective placeholder value for the unique ID.

17. The computing device of claim 16, wherein assigning the unique ID to the key event object comprises injecting the unique ID into the respective placeholder value.

18. The computing device of claim 15, wherein each event object of the plurality of event objects comprises information that describes at least one aspect of a respective event that occurs in the outside world.

19. The computing device of claim 15, wherein, prior to playing back the media content clip, the client computing device obtains the media content clip from a media content library that stores the media content clip in connection with the unique ID.

20. The computing device of claim 15, wherein the plurality of key event objects constitute event objects that pass through a filter that is implemented based on the set of rules.

* * * * *